US012780429B2

(12) United States Patent
Ren et al.

(10) Patent No.: US 12,780,429 B2
(45) Date of Patent: Nov. 3, 2026

(54) METAL-AIR BATTERY COMBUSTION ENGINE HYBRID SYSTEM

(71) Applicant: General Electric Company, Evandale, OH (US)

(72) Inventors: Muqing Ren, Schenectady, NY (US); Jeffrey N. Slotnick, Niskayuna, NY (US); Joseph J. Shiang, Niskayuna, NY (US); Jonathan Doll, Niskayuna, NY (US); Kmk Genghis Khan, Niskayuna, NY (US); Abhinav Saxena, San Ramon, NY (US); Daniel J. Erno, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/070,962

(22) Filed: Mar. 5, 2025

(65) Prior Publication Data

US 2026/0264864 A1 Sep. 10, 2026

(51) Int. Cl.

| | |
|---|---|
| ***B64D 27/33*** | (2024.01) |
| ***F02C 6/00*** | (2006.01) |
| ***H01M 4/38*** | (2006.01) |
| ***H01M 12/02*** | (2006.01) |
| ***H01M 12/08*** | (2006.01) |

(52) U.S. Cl.

CPC ................ *B64D 27/33* (2024.01); *F02C 6/00* (2013.01); *H01M 4/382* (2013.01); *H01M 12/02* (2013.01); *H01M 12/08* (2013.01)

(58) Field of Classification Search

CPC .......... B64D 27/33; F02C 6/00; H01M 4/382; H01M 12/02; H01M 12/08

See application file for complete search history.

(56) References Cited

U.S. PATENT DOCUMENTS

| | | | | |
|---|---|---|---|---|
| 8,012,633 | B2 | 9/2011 | Gordon et al. | |
| 8,119,295 | B2 | 2/2012 | Drews et al. | |
| 9,331,497 | B2 * | 5/2016 | Beaston | H02J 7/00 |
| 10,906,658 | B2 | 2/2021 | Long et al. | |
| 11,764,427 | B2 * | 9/2023 | Lee | H01M 8/04164 429/403 |

(Continued)

FOREIGN PATENT DOCUMENTS

| | | | |
|---|---|---|---|
| DE | 112014002204 | B4 | 5/2019 |
| JP | H089510 | A | 1/1996 |

(Continued)

OTHER PUBLICATIONS https://web.archive.org/web/20210927073437/https://ease-storage.eu/wp-content/uploads/2016/03/EASE_TD_M-Air.pdf#expand. 2016.*

Ease (Year: 2016).*

*Primary Examiner* — Rodolphe Andre Chabreyrie

(74) *Attorney, Agent, or Firm* — Smith, Gambrell & Russell LLP

(57) ABSTRACT

A hybrid propulsion system includes an engine which includes a metal-air battery pack, a combustion chamber, and a propulsion power bus. The propulsion power bus is configured to receive energy from the metal-air battery pack and the combustion chamber, regulate voltage of the engine, manage an electric load of the engine, monitor electrical system faults or abnormalities, manage the heat generated within the engine, and distribute a stable and reliable power supply to propulsion-related components, such as the propeller or turbine.

20 Claims, 6 Drawing Sheets

(56) References Cited

U.S. PATENT DOCUMENTS

| | | | | |
|---|---|---|---|---|
| 2002/0095247 | A1 | 7/2002 | Ding et al. | |
| 2006/0099472 | A1 | 5/2006 | Hsu | |
| 2013/0189592 | A1 | 7/2013 | Roumi et al. | |
| 2014/0318106 | A1 | 10/2014 | Mizuno et al. | |
| 2015/0020531 | A1* | 1/2015 | Hanebuth | H01M 10/615 60/805 |
| 2017/0033379 | A1* | 2/2017 | Kwon | H01M 8/04507 |
| 2020/0144687 | A1* | 5/2020 | Lee | H01M 12/06 |
| 2022/0281351 | A1 | 9/2022 | Bartsch et al. | |
| 2023/0318091 | A1 | 10/2023 | Sheerin et al. | |
| 2024/0208663 | A1 | 6/2024 | Weaver et al. | |
| 2024/0308350 | A1* | 9/2024 | Gariepy | H02J 7/0013 |

FOREIGN PATENT DOCUMENTS

| | | | |
|---|---|---|---|
| JP | 2002-320303 | A | 10/2002 |
| KR | 10-2023-0153196 | A | 11/2023 |

* cited by examiner

100

400

500

METAL-AIR BATTERY COMBUSTION ENGINE HYBRID SYSTEM

TECHNICAL FIELD

The present disclosure relates to aerial vehicles, and specifically to hybrid-/electric-propulsion by combining batteries with propulsion system in a single system.

BACKGROUND

Unless otherwise indicated herein, the materials described in this section are not prior art to the claims herein and are not admitted as being prior art by inclusion in this section.

A propulsion system for an aircraft may include a turbine. A hybrid propulsion system may include a combustion engine and a battery pack to power the turbine.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
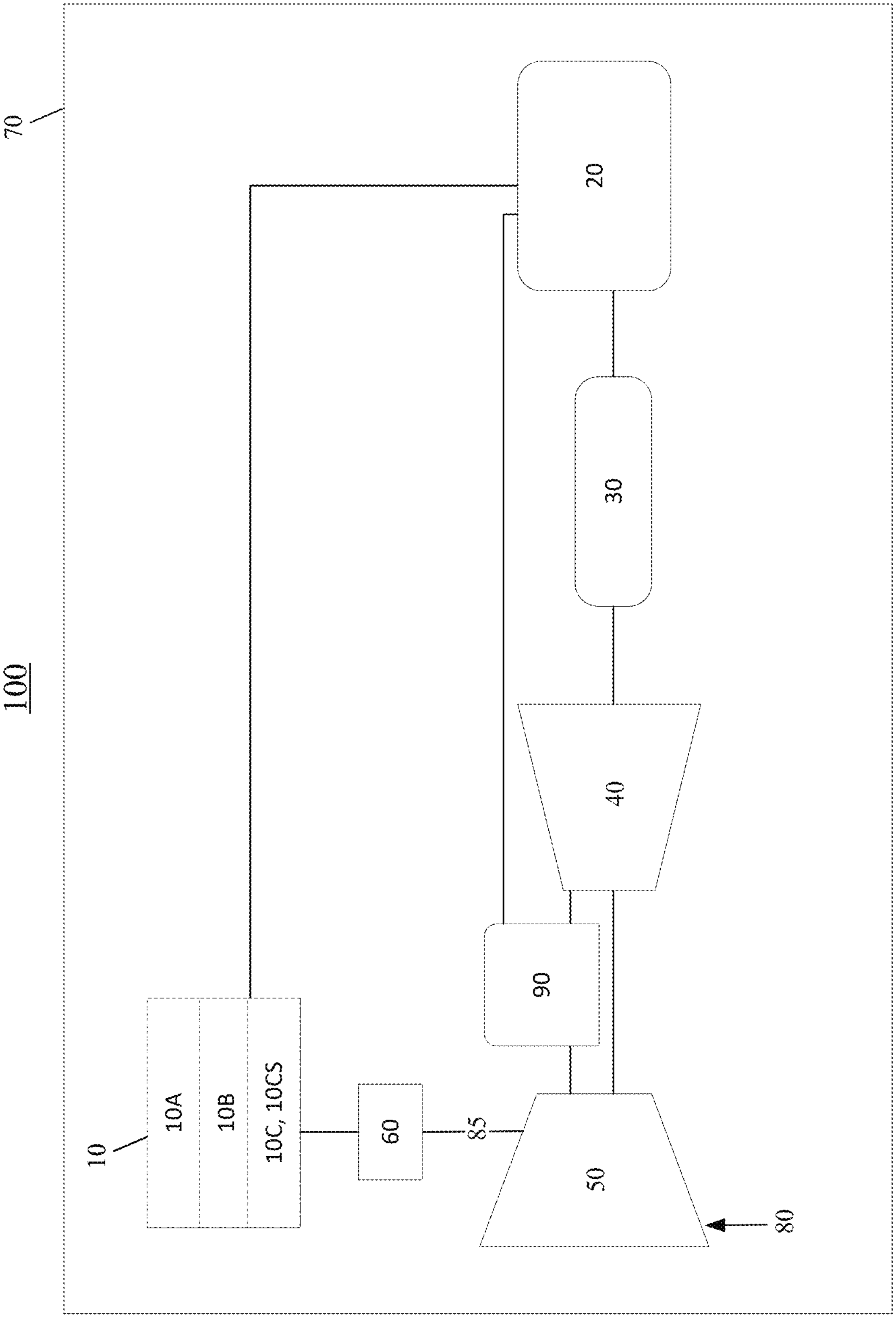
FIG. 1 illustrates a hybrid electric propulsion system in accordance with the principles of this disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a," "an," and "the" include plural references unless the context clearly dictates otherwise.

Although this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the features illustrated herein, and any additional applications of the principles of this disclosure, as illustrated herein, which would occur to one skilled in the relevant art and having possession of this disclosure, are to be considered within the scope of this disclosure.

Approximating language, as used herein, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, or fifteen percent margin in either individual values, range(s) of values and/or endpoints defining range(s) of values.

Hybrid electric aircraft engines may reduce the environmental impact of aircraft by utilizing electric motors powered by batteries or fuel cells in tandem or alternately with a combustion engine to power the propulsion system. The electric powered motors may be limited by the power density of the batteries, such as lithium-ion batteries, or fuel cells as well as the operation temperature required for current battery technology.

The difficulty in increasing battery power density lies in overcoming a combination of chemical reaction limits, material properties, heat management challenges, and the need to balance safety and longevity. Innovations in battery materials, such as solid-state batteries and advanced cathodes and anodes, better thermal management systems, and more efficient manufacturing processes will be key to improving power density. However, each step forward requires careful optimization to prevent sacrificing other aspects like battery life, cost, and safety, which also affects the overall motor performance and longevity.

The operating temperature limits electric-powered motors due to several factors. High temperatures degrade the efficiency of magnetic materials used in the motor, increase electrical resistance in windings, leading to energy loss and reduced efficiency, and cause mechanical stresses from thermal expansion that affect alignment and cause wear or damage. Excessive heat can also damage insulation materials, leading to short circuits, and degrade lubricants, resulting in increased friction and wear. In electric vehicles, high temperatures reduce battery performance, limiting the power available to the motor. These factors emphasize the importance of maintaining an optimal operating temperature for efficient, safe, and long-lasting motor performance.

Metal-air batteries, such as lithium-air or aluminum-air, offer high theoretical energy densities, making them attractive for energy storage. However, their integration into hybrid electric aircraft engines presents significant challenges since these batteries rely on oxygen from the environment for their electrochemical reactions, making it difficult to manage a consistent oxygen supply at varying altitudes and pressures. Thermal and water management is another concern, as some metal-air batteries generate heat and water as byproducts, which must be controlled to avoid operational inefficiencies and added weight.

FIG. 1 illustrates a hybrid electric propulsion system, arranged in accordance with at least some embodiments described herein. Hybrid electric propulsion system 100 includes an engine 70 which includes a battery or battery pack 10, a propulsion power bus 20, a generator 30, a propeller or turbine 40, a compressor 50, a heat exchanger 60 and a combustion chamber 90. In aspects, hybrid electric propulsion systems (e.g., for aircraft applications) of this disclosure may be in the form of a hybrid electric turbo prop engine.

Battery 10 is a metal-air battery or a metal-air battery pack. Metal-air battery 10 is comprised of an anode 10A, an electrolyte 10B, and a cathode 10C. Anode 10A is made of metal and may serve as an energy source for the hybrid aircraft propulsion system. Anode 10A includes one or more elements selected from Li, Al, Zn, Mg, Na, Sn, K, In, Sb, Ag, Au, Pt, Pd, Ti and/or Ge, and/or any other suitable elements. Electrolyte 10B includes organic electrolytes, ionic liquids, alkaline electrolytes, and/or ceramic electrolytes, and/or any other suitable material. Metal-air battery 10 utilizes oxygen from the air as cathode 10C rather than storing all reactants internally, and cathode 10C includes a cathode support 10CS, which is composed of porous carbon or any other suitable material. Cathode support 10CS of cathode 10C assists in facilitating a reaction within metal-air battery 10. Cathode support 10CS includes one or more of Zn, Mg, C, N, O, Na, Sn, In, Sb, Ag, Au, Pt, Pd, Fe, P, Cl, Co, Mo, W, C, Ni, Mn, Bi, Sr, and/or Ba, and/or any other suitable material. Electrolyte 10B present in metal-air battery 10 enables the flow of ions between anode 10A and cathode support 10CS.

Metal-air battery 10 has a high energy density, which may be achieved by leveraging metal as anode 10A and air (oxygen) as cathode 10C as opposed to conventional batteries, where both anode and cathode materials are contained within a battery packaging. Metal-air battery 10 may be a high energy density battery and may be an electrochemical storage device that is capable of storing a significant amount of energy per unit of mass or volume. Metal-air battery 10 may provide higher energy density than other metal-ion batteries by utilizing atmospheric oxygen as the cathode material, significantly reducing weight and volume. When metal anode 10A (such as lithium, zinc, or aluminum) reacts with oxygen from the air as cathode 10C, the reaction may form metal oxides or hydroxides and may release a significant amount of energy. These reactions may be more energy-dense compared to the intercalation reactions in metal-ion batteries, where ions are inserted into the lattice structure of the electrode materials. The active material of the positive electrode is oxygen contained in the air, which is a strong oxidizing agent, light in weight, and normally available everywhere. As the oxygen is supplied from outside the battery, most of the interior of the battery can be used to accommodate the negative electrode material. This gives metal-air batteries a large capacity. The specific and volumetric energy densities can reach more than 500 Wh/kg. By comparison, lithium-ion battery energy density ranges between 260-270 Wh/kg, while lead-acid batteries range from 50-100 Wh/kg. The unique configuration of metal-air battery 10 is, in some aspects, provided in an open packaging design to enable a continuous intake of oxygen from air in the environment supplied to metal-air battery 10. An open packaging design for a metal-air battery refers to a configuration that exposes or partially reveals the internal components without fully enclosing them in a sealed casing. This design maximizes the battery's exposure to air, allowing the metal (such as zinc, lithium, or aluminum) to react with oxygen from the surrounding environment for energy production. The design typically involves limited enclosure, providing structural support for the metal electrode and electrolyte while enabling airflow to enhance performance. In some cases, the internal components might be visible or more accessible, which is useful for testing or monitoring. Overall, an open packaging design balances the need for air exposure with the protection and accessibility of key elements.

Compressor 50 intakes air 80 and produces compressed air by compressing the incoming air and supplying compressed air to combustion chamber 90. A portion of the compressed air 85 from compressor 50 is supplied to metal-air battery 10 through a conduit from compressor 50 to metal-air battery 10. Air 85 may have a flow rate of about 14 g/sec to about 180 g/sec.

Metal-air battery 10 combines power density and energy efficiency of each component and operates with lower carbon emissions than conventional combustion power sources. A metal-air battery combines power density and energy efficiency through its unique electrochemical process, which leverages the reaction between a metal (such as zinc, aluminum, or lithium) and oxygen from the air. The key to its power density lies in the fact that it uses oxygen from the environment, eliminating the need for heavy oxidizers or other components inside the battery. This allows for a higher energy density compared to traditional batteries, as the weight of the oxidizing agent is not a factor, resulting in a lighter, more efficient system. The metal-air battery's energy efficiency is driven by its ability to produce electricity with fewer losses during the chemical reactions. When the metal reacts with oxygen, energy is released in a highly efficient manner, especially when compared to conventional combustion processes, which typically experience a significant loss of energy due to heat dissipation.

In terms of lower carbon emissions, metal-air batteries contribute to a cleaner energy cycle because they rely on the natural abundance of oxygen in the air, eliminating the need for carbon-intensive materials and processes like fossil fuel combustion. Unlike conventional power sources that burn fuels to generate energy, leading to the release of carbon dioxide and other pollutants, metal-air batteries produce energy with minimal emissions. This makes them a more sustainable alternative, offering a cleaner way to store and convert energy while significantly reducing the environmental impact associated with traditional combustion power sources. Overall, metal-air batteries provide a combination of high power density, energy efficiency, and lower carbon emissions, making them beneficial for sustainable energy solutions.

The hybrid architecture of metal-air battery 10 enables continuous operation of metal-air battery 10 at a temperature of 100° C. to a temperature of 200° C. Metal-air battery 10 operates at a pressure of ≥1 atm. Air provided to metal air battery 10 from compressor 50 may be cooled down or warmed up by a heat exchanger 60. Heat exchanger 60 may utilize heat from any part of engine 70, including combustion chamber 90, generator 30, propeller or turbine 40, compressor 50, and engine 70 exhaust to keep metal-air battery 10 warm at a temperature range of 100-200° C. Each component of engine 70 may be at a different temperature and pressure and heat exchanger 60 may be configured based on the temperature and pressure of the component of engine 70 selected to supply heat to heat exchanger 60. For example, combustion chamber 90 may operate at a temperature of 500° C.-1500° C. and a pressure of about 30 bar, propeller or turbine 40 may operate at a temperature of 200° C.-1500° C. and a pressure of about 30 bar, compressor 50 may operate at a temperature of 150° C.-500° C. and a pressure of about 30 bar, and engine 70 exhaust may be at a temperature of 600° C.-1000° C. at atmospheric pressure. Heat exchanger 60 may maintain an operating temperature of 100-200° C. for metal-air battery 10. An operating temperature of 100-200° C. for metal-air battery 10 improves the kinetic and thermodynamic performance of metal-air battery 10. Ionic conductivity and polarization current of metal-air battery 10 are about 30× greater when operated at a temperature of about 150° C. versus operating at a temperature of 25° C.

Propulsion power bus 20 is configured to receive and distribute energy from metal-air battery 10 and combustion chamber 90 to propulsion-related components including a propeller or a turbine 40. Propulsion power bus 20 may interface with system 100 and may regulate voltage, manage the electric load, monitor electrical system faults or abnormalities, manage the heat generated within system 100, provide communication, control overall system 100, and enable a stable and reliable power supply to propulsion system 100. System 100 integrates metal-air battery 10 with combustion chamber 90 to power a shaft to drive propeller or turbine 40. In aspects, the hybrid propulsion system is enabled by a secondary-energy source. In aspects, generator 30 may provide power for charging metal-air battery 10.

Hybrid propulsion system 100 provides compressed air generated by compressor 50 to metal-air battery 10. Hybrid propulsion system 100 provides heat to metal-air battery 10 by using heat from engine 70. Heat exchanger 60 may utilize heat from any part of engine 70, including combustion chamber 90, generator 30, propeller or turbine 40, compressor 50, and engine 70 exhaust to keep metal-air battery 10 warm at a temperature range of 100-200° C. Each component of engine 70 may be at a different temperature and pressure and heat exchanger 60 may be configured based on the temperature and pressure of the component of engine 70 selected to supply heat to heat exchanger 60. Heat exchanger 60 maintains an operating temperature of 100-200° C. for metal-air battery 10 to improve the kinetic and thermodynamic performance of metal-air battery 10. Ionic conductivity and polarization current of metal-air battery 10 are about 30× greater when operated at a temperature of about 150° C. versus operating at a temperature of 25° C. Hybrid propulsion system 100 keeps the metal-air battery pack warm at an operational temperature range and the metal-air battery pack provides electric power to the motor. Hybrid propulsion system 100 utilizes both combustion and battery power provided to the propulsion power bus to distribute the energy to power a propeller or a turbine 40.

Figure 2:
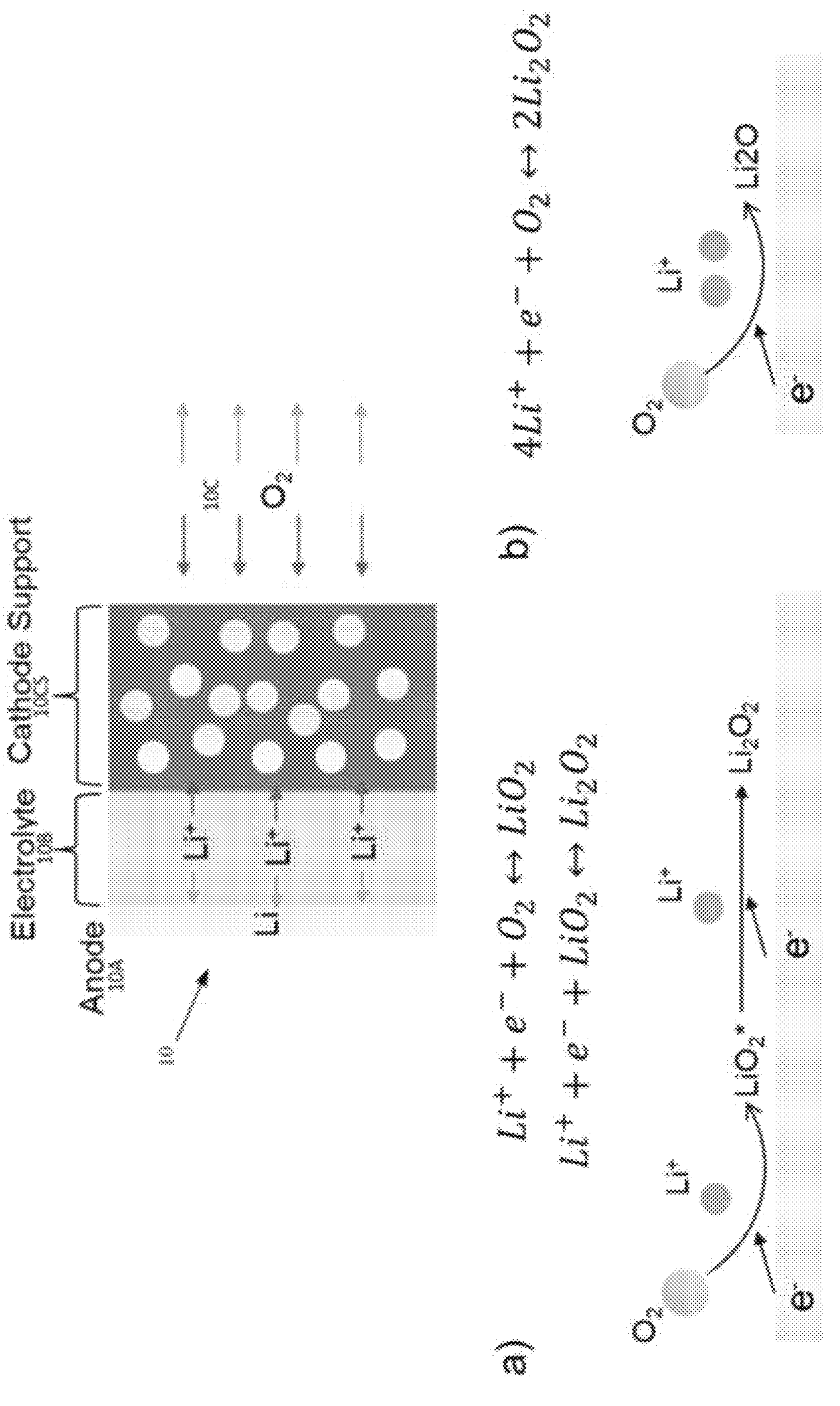
FIG. 2 is a schematic view illustrating the operation of an example metal-air battery in accordance with the principles of this disclosure.

FIG. 2 illustrates an example metal-air battery 10 of system 100, arranged in accordance with at least some embodiments described herein. The components in FIG. 2 that are labeled identically to components of FIG. 1 are not described again for the purposes of brevity.

In an example, battery 10 is a metal-air battery such as a lithium-air (Li-air) cell. As shown at equation a), within metal-air battery 10, lithium (Li) at anode 10A reacts with oxygen ($O_2$) 10C from the air at cathode support 10CS, resulting in the formation of lithium peroxide ($Li_2O_2$) or lithium oxide ($Li_2O$) and the release of energy. Conversely, as shown at equation b), during a charging process for metal-air battery 10, $Li_2O_2$ or $Li_2O$ is decomposed back into lithium and oxygen, which is released back into the air. This cycle of reactions within metal-air battery 10, particularly the use of readily available oxygen as a reactant, significantly contributes to a high energy density for metal-air battery 10 which, in aspects, is five times greater than a standard Li-ion battery. Metal-air battery 10 mitigates thermal-runaway issues of conventional batteries, operates at cold climate, benefits the fuel-operation efficiency, and reduces emissions.

Figure 3:
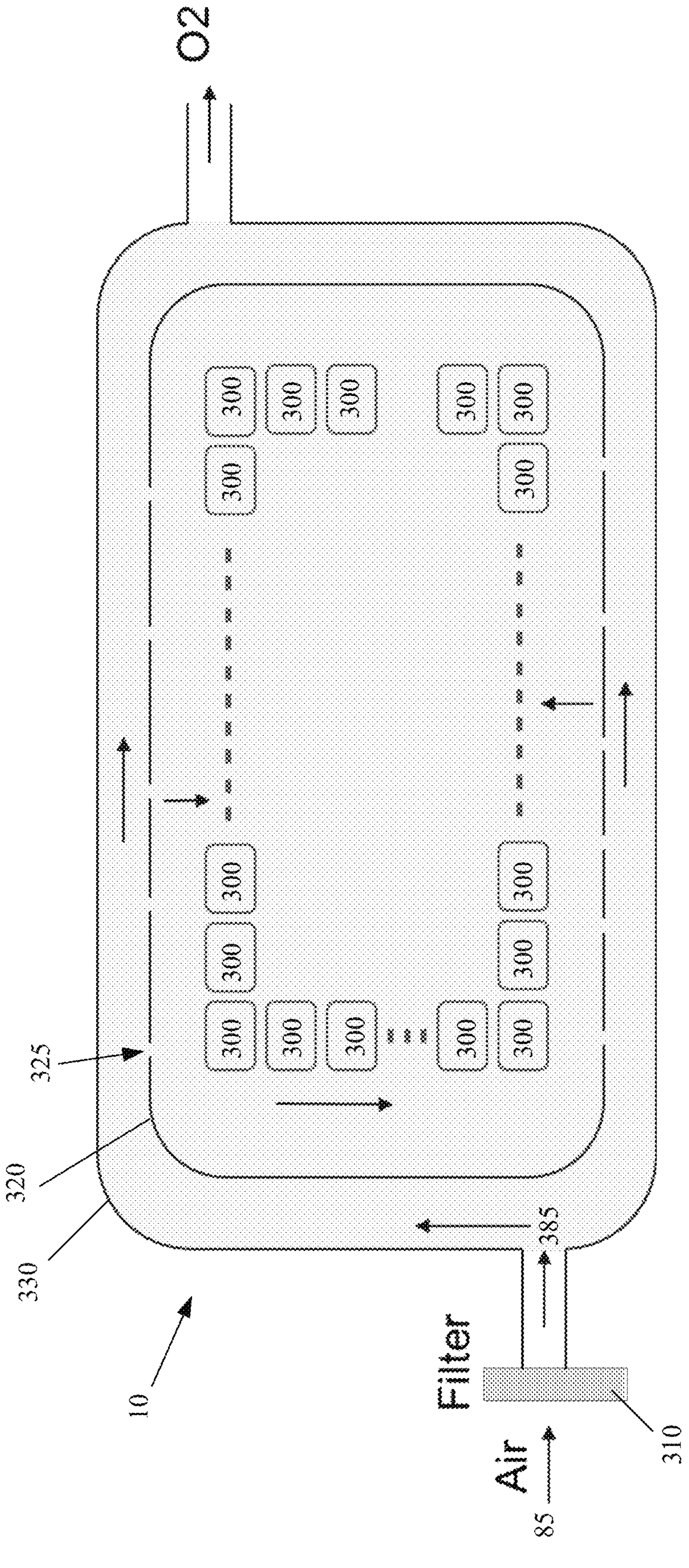
FIG. 3 is a schematic view of an example metal-air battery pack in accordance with the principles of this disclosure.

FIG. 3 is a schematic view of an example metal-air battery pack, arranged in accordance with at least some embodiments described herein. The components in FIG. 3 that are labeled identically to components of FIGS. 1-2 are not described again for the purposes of brevity.

Metal-air battery 10 is a metal-air battery pack. An air filtration system 310 is incorporated to filter incoming air 85. Air filtration system 310 is positioned within an air inlet of metal-air battery pack 10 and may filter air 85 before air 85 reaches an internal layer 320 of metal-air battery pack 10. Air filtration system 310 purifies incoming air 85 by removing particulates, moisture, and other airborne contaminants resulting in clean, dry filtered air 385. Clean dry filtered air 385 prevents contaminants from interfering with chemical reactions of metal-air battery pack 10 which enhances the efficiency of metal-air battery pack 10 and extends metal-air battery pack 10 operational life. In an embodiment, excess $O_2$ from chemical reactions of metal-air battery pack 10 are directed to combustion chamber 90 to improve combustion efficiency and reduce emissions.

The construction of metal-air battery pack 10 may be designed for specific energy requirements through strategic arrangement of metal-air cells 300 within metal-air battery pack 10. In aspects, metal-air cells 300 are interconnected in configurations which may be parallel, in series, or any combination of both, depending on the desired power output and energy density required for metal-air battery pack 10. In aspects, the shape of metal-air cells 300 is a cylindrical or pouch arrangement. For instance, in an embodiment, metal-air cells 300 have a pouch cell arrangement and have improved air flow management provided by the pouch cell arrangement as the metal-air cells 300 are flat and not rolled which allows for a shorter distance inside metal-air battery pack 10 and a lower internal resistance than cylindrical cells.

In aspects, metal-air battery pack 10 has a dual-layer structure with an internal layer 320 and an external outer shell 330. Internal layer 320, in an embodiment, includes a multitude of small, densely spaced openings 325 which provide an open packaging design to enable a continuous intake of filtered air 385. Internal layer 320 may be constructed from a material with a high melting point >250° C. such as, for example, stainless steel, polyimide, Ti, alloys, ceramics aluminum silicate, silicon carbide (SiC), and or ceramic matrix composite (CMC). Internal layer 320 may include metals and metal alloys including, for example, first and second row transition metals, such as Fe, Mo Cr, Ni and/or Mn, or main group metals selected from any of Groups 1, 2, 3, and/or 4 such as Al, Ti, Li, or Mg. Internal layer 320 may include ceramics containing metal oxides (e.g., $Al_2O_3$) or metal carbide (e.g., SiC). Internal layer 320 may include fiber matrix composites such as carbon fiber/carbon matrix, carbon fiber/silicon carbide matrix, silicon carbide fiber/silicon carbide matrix, carbon or silicon carbide fiber/polymer matrix material systems. Internal layer 320 may include material of different material classes combined in a laminate structure to minimize or otherwise reduce the possibility of crack propagation that may induce unwanted air leakage pathways into the battery components.

Such a perforated design of internal layer 320 improves filtered air 385 management and ensures a steady and optimized flow of filtered air 385 into the metal-air cells 300. Openings 325 enable oxygen from filtered air 385 to penetrate metal-air battery pack 10 to metal-air cells 300 and participate in the electrochemical reactions that provide power generation. Openings 325 may have a size range of about 200 μm to about 1 mm.

In one example, an outer shell 330 encases the internal layer 320. Outer shell 330 fortifies metal-air battery pack 10 against external stresses and is constructed from a robust material which is sufficiently durable to withstand the rigors of everyday use and environmental exposure. Outer shell 330 may be constructed from stainless steel, metal alloys, or ceramics including metals and metal alloys including first and second row transition metals, such as Fe, Mo Cr, Ni and Mn, or main group metals selected from any of Groups 1, 2, 3, or 4, such as Al, Ti, Li, or Mg. Outer shell 330 may include ceramics including a metal oxides (e.g., $Al_2O_3$) or metal carbide (e.g., SiC). Outer shell 330 may include fiber matrix composites such as carbon fiber/carbon matrix, carbon fiber/silicon carbide matrix, silicon carbide fiber/silicon carbide matrix, carbon or silicon carbide fiber/polymer matrix material systems. In alternate embodiments, outer shell 330 may include high-temperature polymer materials such as polyether-ether-ketone (PEEK). Outer shell 330 may include material of different material classes combined in a laminate structure to minimize the possibility of crack propagation that may induce unwanted air leakage pathways into the battery components. Outer shell 330 protects metal-air cells 300 from mechanical damage such as impacts and vibrations, which could otherwise compromise metal-air battery pack 10 functionality and lifespan.

In embodiments, metal-air battery pack 10 incorporates advanced thermal management and safety features as detailed below, that maintain metal-air battery pack 10 temperature within optimal ranges (e.g., 100° C. to 200° C.) and ensure stable performance. Safety mechanisms mitigate risks such as overcharging and short-circuiting and ensure metal-air battery pack 10 operates safely under all conditions.

Figure 4:
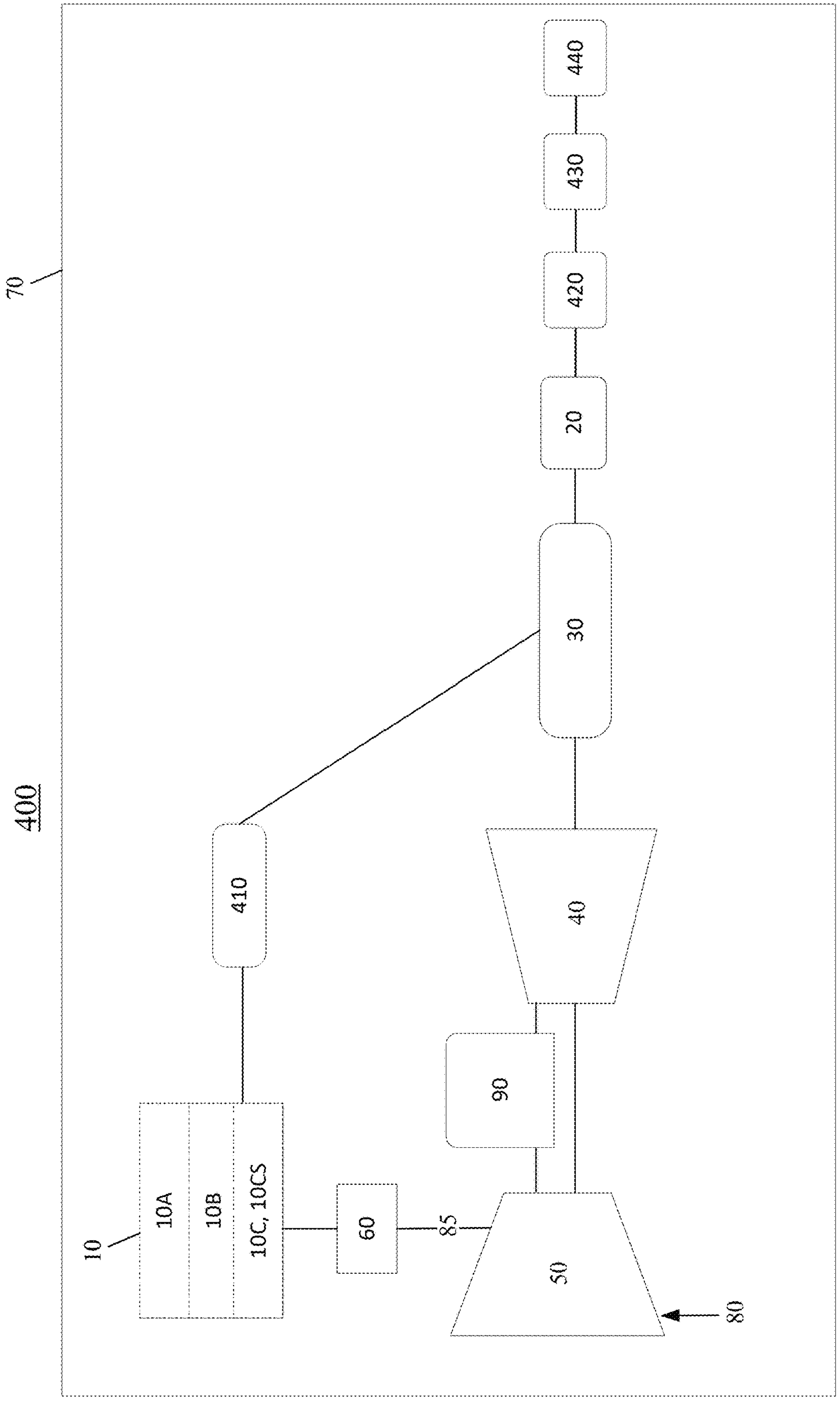
FIG. 4 illustrates another hybrid electric propulsion system in accordance with the principles of this disclosure.

FIG. 4 illustrates another hybrid propulsion system, arranged in accordance with at least some embodiments described herein. The components in FIG. 4 that are labeled identically to components of FIGS. 1-3 are not described again for the purposes of brevity. Hybrid propulsion system 400 includes engine 70 which includes battery or battery pack 10, propulsion power bus 20, generator 30, propeller or turbine 40, compressor 50, combustion chamber 90, a battery management system (BMS) 410, an inverter/converter 420, a controller 430, and a motor 440.

BMS 410 prevents damage to battery or battery pack 10 from overcharging and over-discharging by providing advanced thermal management and safety to battery or battery pack 10 by controlling current flow from and to battery or battery pack 10. BMS 410 communicates with sensors in battery pack 10 via high-speed data connections to monitor voltage, current and temperature in real time. The sensors provide continuous feedback, allowing BMS 410 to balance metal-air cells 300, prevent overcharging/discharging, manage battery pack 10 operation temperature and thermal protection. Then BMS 410 relays this data to the power propulsion bus 20 for optimized energy distribution and safety. Generator 30 converts mechanical energy from the engine into electrical power and supplies electricity to electric motors that drive propeller or turbine 40. Additionally, generator 30 may be configured to work as a power source for charging battery pack 10. Inverter/converter 420 manages AC/DC conversion for motors within engine 70 and for battery pack 10. Controller 430 regulates and distributes the power flow from the metal-air battery pack 10 and electricity generated from mechanical energy of fuel combustion by generator 30 to motor 440 and optimizes propulsion performance.

Figure 5:
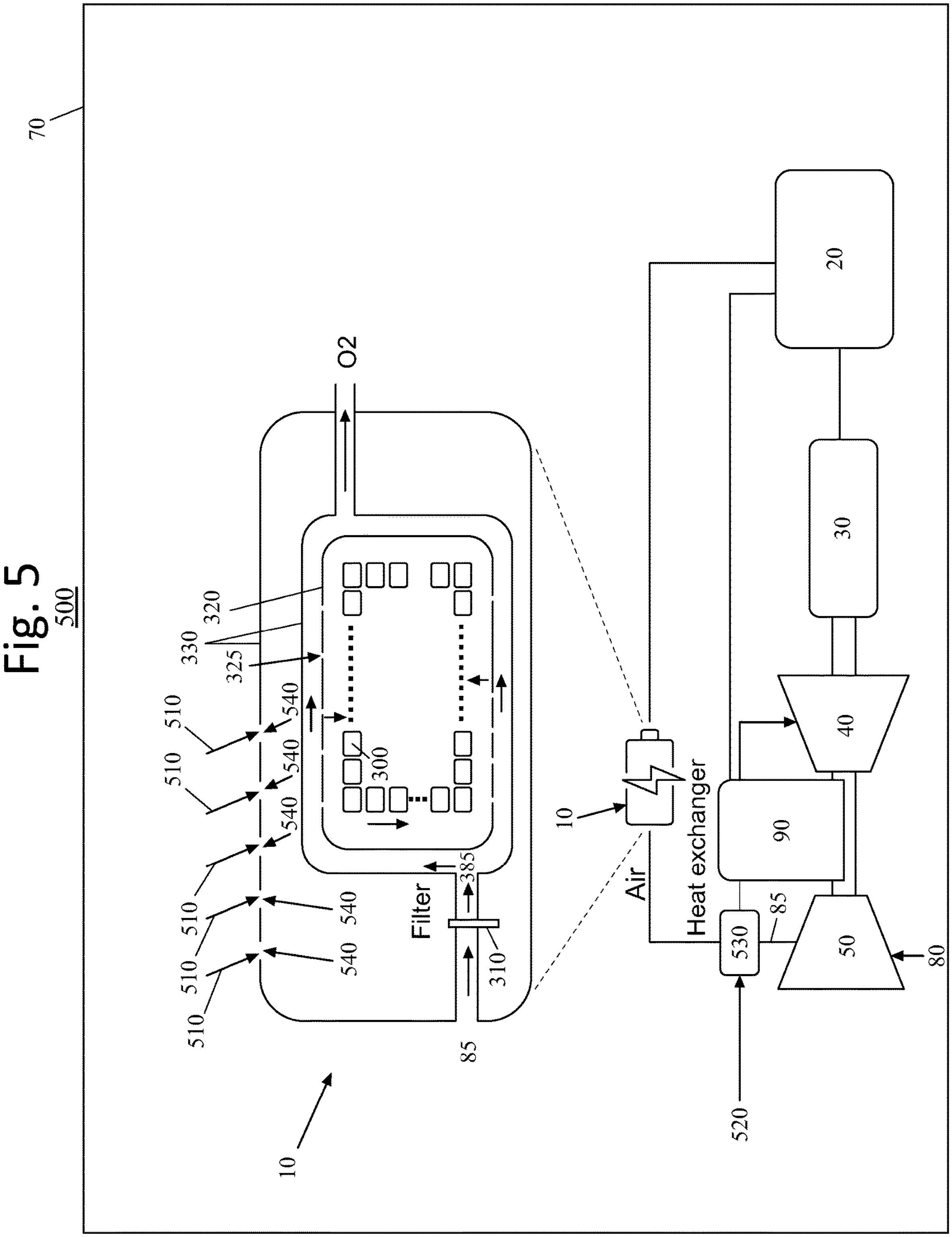
FIG. 5 illustrates another hybrid electric propulsion system in accordance with the principles of this disclosure.

FIG. 5 illustrates another hybrid propulsion system, arranged in accordance with at least some embodiments described herein. The components in FIG. 5 that are labeled identically to components of FIGS. 1-4 are not described again for the purposes of brevity. Hybrid electric propulsion system 500 includes engine 70, battery or battery pack 10, propulsion power bus 20, generator 30, propeller or turbine 40, compressor 50, combustion chamber 90, and a heat exchanger 530. Heat exchanger 530 may be combined and integrated into battery or battery pack 10 and may regulate a core temperature of battery or battery pack 10 to reduce temperature gradients and keep battery or battery pack 10 within desired temperature limits. Fuel 520 and/or bypass air 510 may be utilized as the working heat transfer fluid and may additionally regulate the temperature. Heating of fuel 520 may have the additional benefit of improving the performance and efficiency of combustion chamber 90. In embodiments where bypass air 510 is utilized as the working heat transfer fluid, outer shell 330 may include bypass air holes 540 on an outermost edge which may allow bypass air 510 to flow around battery or battery pack 10 and regulate a temperature of filtered air 385.

Figure 6:
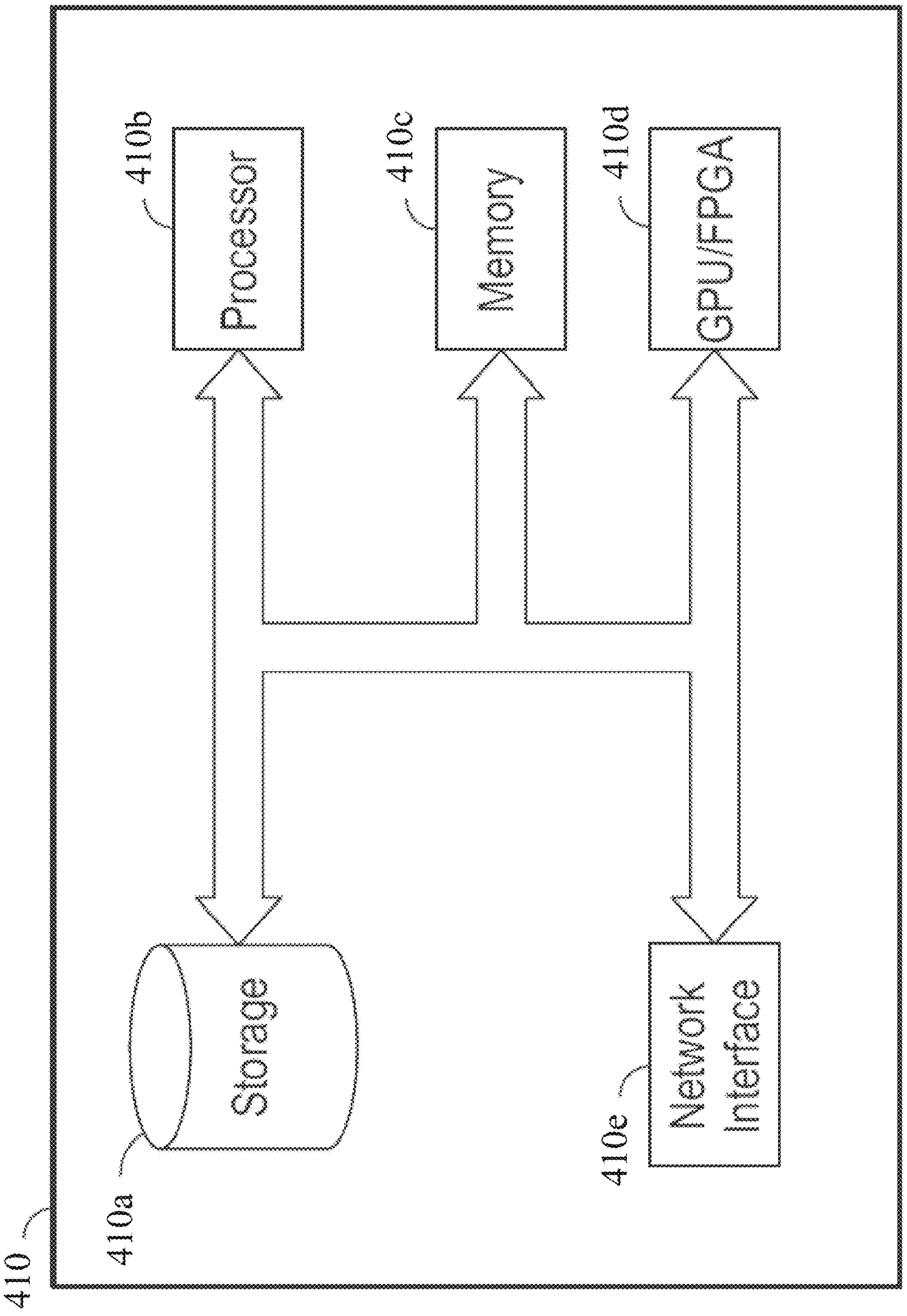
FIG. 6 illustrates a block diagram of a battery management system (BMS) of the hybrid electric propulsion system of FIG. 1, in accordance with principles of this disclosure.

With brief reference to FIG. 6, exemplary components of the BMS 410 include, for example, a database 410*a*, one or more processors 410*b*, at least one memory 410*c*, and a network interface 410*e*. In aspects, the BMS 410 may include a graphical processing unit (GPU) 410*d*, which may be used for processing machine learning network models. Various components of the BMS 410 may be utilized to carry out instructions to perform the various operations of the hybrid electric propulsion systems of this disclosure. Further, the BMS 410 may include communication circuitry capable of wired or wireless communication to receive data from other devices.

Indeed, as used herein, the term "controller," "controller" or the like includes "processor," "digital processing device"

and like terms, and can include a component configured or adapted to provide instruction, control, operation, or any form of communication for operable components to carry out the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), proportional resonant controller (PR), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller can also include a data storage component accessible by the processor, including memory, whether transient, volatile or non-transient, or non-volatile memory.

A system in accordance with the present disclosure provides an aircraft propulsion system that incorporates metal-air batteries that can improve energy/power densities by as much as 5×. A system in accordance with the present disclosure provides an aircraft propulsion system with a battery mass fraction of total aircraft mass that may be reduced by as much as eighty percent. A system in accordance with the present disclosure provides an aircraft propulsion system with air batteries that provide as much as five times the energy density than state-of-the-art Li-ion batteries (LIBs) provide due to an elimination of cathode weight by directly utilizing air. A system in accordance with the present disclosure provides an aircraft propulsion system including hybrid-electric propulsion.

A system in accordance with the present disclosure provides an aircraft propulsion system with the combination of air batteries and an engine that maximizes or otherwise improves the air battery's performance at elevated temperature, such as capacity, power density, round-trip efficiency and low overpotential gaps. A system in accordance with the present disclosure provides an aircraft propulsion system with air battery integration with the engine, and wherein both combustion and air batteries power the shaft to drive a fan or a propeller. A system in accordance with the present disclosure provides an aircraft propulsion system which maximizes or otherwise improves aircraft performance by improving power density and energy efficiency of each component and operates with carbon emission reductions. A system in accordance with the present disclosure provides an aircraft propulsion system that operates at temperatures beyond the limited operation temperature of current battery technology. A system in accordance with the present disclosure provides an aircraft propulsion system with a controller and heat exchanger which utilize the engine's heat to maintain optimum battery conditions to maximize or otherwise improve battery performance.

Finally, the processes and techniques described herein are not inherently related to any apparatus and may be implemented by any suitable combination of components. Further, various types of general-purpose devices may be used in accordance with the teachings described herein. This disclosure has been described in relation to the examples, which are intended in all respects to be illustrative rather than restrictive.

Further aspects of the present disclosure are provided by the subject matter of the following clauses.

A hybrid propulsion system includes an engine which includes a metal-air battery pack, a combustion chamber, and a propulsion power bus. The propulsion power bus is configured to receive energy from the metal-air battery pack and the combustion chamber, regulate voltage of the engine, manage an electric load of the engine, monitor electrical system faults or abnormalities, manage the heat generated within the engine, and distribute a stable and reliable power supply to propulsion-related components.

The hybrid propulsion system of the preceding clause, wherein the metal-air battery pack includes battery cells, and an anode of the battery cells includes one or more elements selected from Li, Al, Zn, Mg, Na, Sn, K, In, Sb, Ag, Au, Pt, Pd, Ti and Ge.

The hybrid propulsion system of any of the preceding clauses, wherein the anode of the battery cells includes Li, Al, or a mixture of both.

The hybrid propulsion system of any of the preceding clauses, wherein the battery cells include at least one of organic electrolytes, ionic liquids, alkaline electrolytes, or ceramic electrolytes.

The hybrid propulsion system of any of the preceding clauses, wherein the battery cells utilize oxygen as a cathode.

The hybrid propulsion system of any of the preceding clauses, wherein the battery cells include a cathode support, and the cathode support includes one or more elements selected from Zn, Mg, C, N, O, Na, Sn, In, Sb, Ag, Au, Pt, Pd, Fe, P, Cl, Co, Mo, W, C, Ni, Mn, Bi, Sr, and Ba.

The hybrid propulsion system of any of the preceding clauses, wherein the cathode support is porous carbon.

The hybrid propulsion system of any of the preceding clauses, further comprising a heat exchanger which utilizes exhaust heat from the engine to heat air provided to the metal-air battery pack.

The hybrid propulsion system of any of the preceding clauses, wherein the metal-air battery pack is maintained at a temperature range from 100° C. to 200° C.

The hybrid propulsion system of any of the preceding clauses, further comprising a controller for controlling a power flow from the metal-air battery pack and electricity generated from mechanical energy.

The hybrid propulsion system of any of the preceding clauses, further comprising a generator for converting direct current power received from the controller to alternating current power.

The hybrid propulsion system of any of the preceding clauses, wherein the metal-air battery receives air from the compressor.

A hybrid propulsion system that includes an engine which includes a metal-air battery pack, a battery management system (BMS), a generator, a combustion chamber, a propulsion power bus, a generator, a controller, an inverter/converter, a motor, a propeller or a turbine, a compressor, and a heat exchanger. The heat exchanger utilizes exhaust heat from the combustion engine to heat air provided to the metal-air battery pack. The battery management system manages the temperature, voltage, current, pressure and safety of the metal-air battery pack, ensures the safe and efficient operation of the metal-air battery pack by monitoring parameters including voltage, current, and temperature, balances battery cells, manages thermal conditions, and communicates with other aircraft components. The generator converts mechanical energy from the engine into electrical power. The inverter/converter manages AC/DC conversion from the motor and the battery pack. The propulsion power bus is configured to receive energy from the metal-air battery pack and the combustion chamber, regulate voltage of the engine, manage an electric load of the engine, monitor electrical system faults or abnormalities, manage the heat generated within the engine, and distribute a stable and reliable power supply to propulsion-related components.

The hybrid propulsion system of any of the preceding clauses, wherein the controller further distributes power flow from the metal-air battery pack and fuel combustion to the motor.

The hybrid propulsion system of any of the preceding clauses, wherein the battery management system prevents damage to the metal-air battery pack from overcharging, over-discharging, and short circuits.

The hybrid propulsion system of any of the preceding clauses, wherein the generator supplies electricity to electric motors that drive the propeller or turbine.

The hybrid propulsion system of any of the preceding clauses, wherein the battery cells utilize oxygen as a cathode.

The hybrid propulsion system of any of the preceding clauses, wherein the generator is configured to work as a power source for charging the metal-air battery pack.

The hybrid propulsion system of any of the preceding clauses, wherein the cathode support is porous carbon.

A hybrid propulsion system that includes an engine which includes a metal-air battery pack, a controller, a battery management system, a generator, a combustion chamber, a propulsion power bus, a generator, a propeller or a turbine, a compressor, and a heat exchanger. An anode of the battery cells includes Li. An electrolyte of the battery cells includes one of organic electrolytes, ionic liquids, alkaline electrolytes, or ceramic electrolytes. A cathode of the battery cells includes oxygen. A cathode support of the battery cells is porous carbon. The heat exchanger utilizes exhaust heat from the engine to heat air provided to the metal-air battery pack. The controller controls a power flow from the metal-air battery pack and electricity generated from mechanical energy by the generator. The propulsion power bus is configured to receive energy from the metal-air battery pack and the combustion chamber, regulate voltage of the engine, manage an electric load of the engine, monitor electrical system faults or abnormalities, manage the heat generated within the engine, and distribute a stable and reliable power supply to propulsion-related components.

The foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A hybrid electric propulsion engine for an aerial vehicle, comprising:

a metal-air battery pack comprising battery cells comprising:

an anode comprising a metal, and a cathode configured to utilize atmospheric oxygen as an active material;

a combustion chamber configured to combust fuel;

a turbine operatively coupled to the combustion chamber;

a generator operatively coupled to the turbine;

a compressor operatively coupled to the turbine and supplying compressed air around an internal layer surrounding the battery cells and providing oxygen to the battery cells; and a propulsion power bus configured to distribute energy from the metal-air battery pack and the combustion chamber to propulsion-related components.

2. The engine of claim 1, wherein the anode of the battery cells comprises one or more of Li, Al, Zn, Mg, Na, Sn, K, In, Sb, Ag, Au, Pt, Pd, Ti, or Ge.

3. The engine of claim 2, wherein the anode of the battery cells comprises Li, Al, or a mixture of both.

4. The engine of claim 2, wherein the battery cells include at least one of organic electrolytes, ionic liquids, alkaline electrolytes, or ceramic electrolytes.

5. The engine of claim 1, wherein the battery cells include a cathode support, and the cathode support includes one or more of Zn, Mg, C, N, O, Na, Sn, In, Sb, Ag, Au, Pt, Pd, Fe, P, Cl, Co, Mo, W, C, Ni, Mn, Bi, Sr, or Ba.

6. The engine of claim 5, wherein the cathode support is comprises porous carbon.

7. The engine of claim 1, further comprising a heat exchanger that utilizes exhaust heat from the engine to heat the compressed air provided to the metal-air battery pack.

8. The engine of claim 6, wherein the metal-air battery pack is maintained at a temperature range from 100° C. to 200° C.

9. The engine of claim 1, further comprising a controller that controls a power flow from the metal-air battery pack and electricity generated from mechanical energy.

10. The engine of claim 1, wherein the generator converts mechanical energy from the turbine into electrical power for powering an aircraft's electrical systems.

11. The hybrid electric propulsion engine of claim 1, wherein the compressor supplies the compressed air to the metal-air battery pack at a flow rate between 14 grams per second and 180 grams per second.

12. The hybrid electric propulsion engine of claim 1, the metal-air battery pack comprising: the internal layer formed of a material capable of withstanding temperatures greater than 250° C. and having a plurality of openings ranging from 200 micrometers to 1 millimeter in size; and an outer protective shell surrounding the internal layer.

13. An engine for a hybrid propulsion system, comprising:

a metal-air battery pack with battery cells;

a generator;

a combustion chamber;

a propulsion power bus;

a turbine;

a compressor operatively coupled to the turbine and that supplies compressed air around an internal layer surrounding the battery cells and providing oxygen to the battery cells; and a heat exchanger, wherein the heat exchanger utilizes exhaust heat from the engine to heat air provided to the metal-air battery pack, wherein the metal-air battery pack incorporates management and safety features to manage a temperature, a voltage, a current, and a pressure of the metal-air battery pack, balance the battery cells, manage thermal conditions, and communicate with other aircraft components, wherein the generator converts mechanical energy from the turbine into electrical energy to power an aircraft's electrical systems, and wherein the propulsion power bus is configured to distribute energy from the metal-air battery pack and the combustion chamber, regulate power of the engine, manage an electric load of the engine, monitor electrical system faults or abnormalities, manage the heat generated within the engine, and distribute a power supply to propulsion-related components.

14. The engine of claim 13, further comprising a controller that regulates power flow from the metal-air battery pack and a fuel combustion to a motor.

15. The engine of claim 13, wherein the management and safety features prevent damage to the metal-air battery pack from overcharging, over-discharging, and short circuits.

16. The engine of claim 13, wherein the generator supplies electricity to electric motors that drive the turbine to thereby convert mechanical energy from the turbine into electrical energy for powering an aircraft's electrical systems.

17. The engine of claim 13, wherein the battery cells utilize oxygen as a cathode.

18. The engine of claim 13, wherein the generator is configured to work as a power source for charging the metal-air battery pack.

19. The engine of claim 13, wherein the battery cells comprise a cathode support that is porous carbon.

20. An engine for a hybrid propulsion system, comprising:

a metal-air battery pack comprising battery cells, wherein an anode of the battery cells includes Li, an electrolyte of the battery cells includes one of organic electrolytes, ionic liquids, alkaline electrolytes, or ceramic electrolytes, a cathode of the battery cells includes oxygen, and a cathode support of the battery cells is porous carbon, the metal-air battery pack further comprising an internal layer formed of a material capable of withstanding temperatures greater than 250° C. and having a plurality of openings ranging from 200 micrometers to 1 millimeter in size and an outer protective shell surrounding the internal layer;

a generator;

a combustion chamber;

a propulsion power bus;

a turbine;

a compressor providing compressed air and oxygen to the battery cells through the plurality of openings; and a heat exchanger wherein the heat exchanger utilizes exhaust heat from the engine to heat the compressed air provided to the metal-air battery pack, wherein the generator converts mechanical energy from the turbine into electrical energy for powering an aircraft's electrical systems, and wherein the propulsion power bus is configured to distribute energy from the metal-air battery pack and the combustion chamber to propulsion-related components.

* * * * *